Oct. 28, 1958        J. E. BORAH        2,858,159

BUMPER, BUMPER-GUARDS AND YIELDABLE MOUNTING THEREFOR

Filed May 16, 1956        2 Sheets-Sheet 1

INVENTOR.
JOHN E. BORAH
BY
M. A. Hobbs
ATTORNEY

INVENTOR.
JOHN E. BORAH
BY M. A. Hobbs
ATTORNEY

United States Patent Office 2,858,159
Patented Oct. 28, 1958

2,858,159

BUMPER, BUMPER-GUARDS, AND YIELDABLE MOUNTING THEREFOR

John E. Borah, Mishawaka, Ind.

Application May 16, 1956, Serial No. 585,315

5 Claims. (Cl. 293—71)

The present invention relates to vehicle bumpers and the like and more particularly to bumper guards or attachments and to a means for mounting bumpers and said guards on vehicles.

In this day and age with combined forces such as increased present day life tensions and constantly increased number of motor vehicles on the streets and highways, the driving of the automobiles has become hazardous and on many occasions even the minor collisions result in damages to automobiles and serious injuries to human lives. Many of these dangers are due to the fact that conventional construction of automobile bumpers and bumper-guards does not provide effective cushioning and shock absorbing elements when vehicles collide. Therefore, the primary object of the present invention is to provide life saving safety features through means of an effective impact shock absorbing and positive cushioning element for motor car bumper and bumper-guards.

In normal city driving and curb parking automobiles often collide with one another, usually bumper to bumper or bumper guard to bumper guard. These bumps and knocks frequently produce deep scratches and cracks in the plating on the bumpers and guards which expose the base metal to the weather and to road water and dirt. The exposed base metal corrodes rapidly from the water and dirt which often contain salt and other highly corrosive chemicals and produces a permanent discoloration in the finish of those members. In cases of more severe bumping conventional bumper guards are sometimes displaced or torn completely from spot welded mounting fixtures holding them on the bumper, often causing substantial and irreparable damage to the bumper plating and possibly denting or otherwise seriously damaging the base metal.

Another object of the present invention therefore is to provide mounting construction of metal and rubber bumper and bumper-guards, which will not only yield during any impact of motor vehicle collision but which will more effectively withstand blows from bumping and knocking of other vehicles than conventional rigid spot welded guard mountings.

Another object of the invention is to provide a bumper guard which can readily be assembled and mounted on a vehicle and easily removed, serviced and replaced without the use of special tools or skill on the part of the mechanic.

Still another object of the invention is to provide a relatively simple and easily mountable bumper and bumper guard attachment for cushioning blows of colliding vehicles.

A further object of the invention is to provide a sturdy, resiliently mounted, bumper guard for giving maximum safety and protection to colliding automobiles, particularly during normal city driving and curb parking.

Additional objects and advantages will become apparent from the following description and accompanying drawings, in which.

Figure 1:
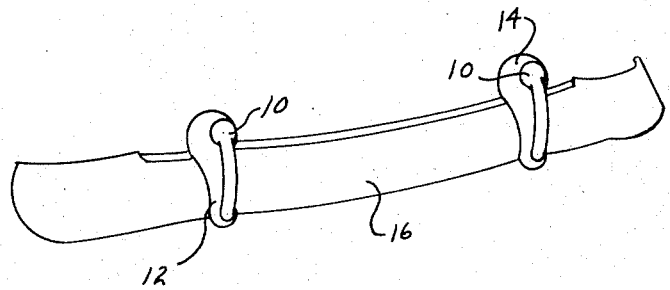
Figure 1 is a perspective view of an automobile front bumper having two bumper guards mounted thereon.
Figures 2, 3:
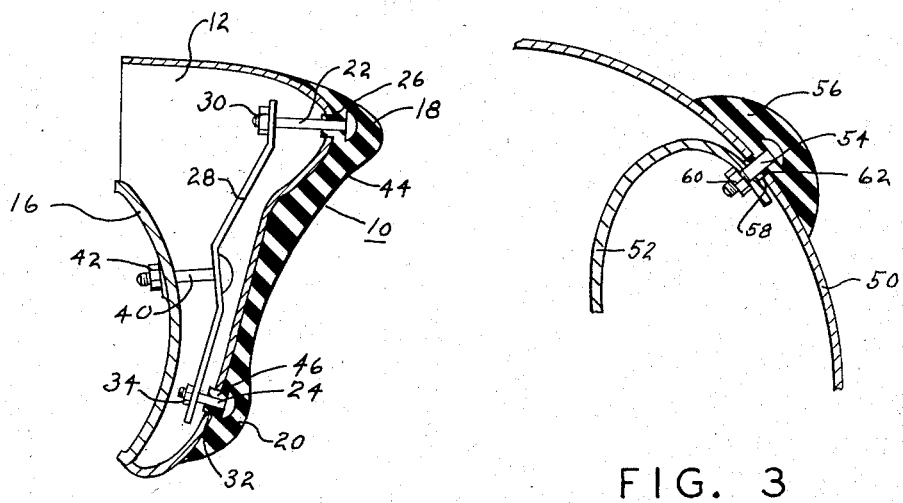
Figure 2 is a vertical cross sectional view of one of the bumper guards shown in Figure 1.
Figure 3 is a fragmentary cross sectional view through a bumper and bumper mount showing the manner in which said members are connected.

In the embodiment shown in Figures 1 and 2 an element or attachment 10 of resilient material, such as natural or synthetic rubber, vinyl or the like is secured to the forward surface of each of the bumper guards 12 and 14 of bumper 16 and is shaped to fit snugly on the surface of the guards and to blend in with the contour lines of the guards so that no abrupt line in the silhouette is apparent between the element and the guard. In order for the element to absorb the blows during bumping and to give the element lines which blend with the lines of the guard, relatively thick lobes 18 and 20 are provided near the upper and lower ends of the element. These lobes also provide a secure anchor of the ends of bolts 22 and 24 which are employed to mount the element on the guard and to secure the guard on the bumper. Bolt 22 passes through a hole 26 in the forward end of the protruding nose of the guard through a hole in the upper end of bracket 28 and is held in place by nut 30 threaded onto the end thereof. Bolt 24 passes through a hole 32 in the lower end of the guard and through a hole in the lower end of bracket 28 and is held in place by a nut 34 threaded onto the end. This assembly is secured to the bumper of the vehicle by a bolt 40 extending through a hole in bracket 28 between bolts 22 and 24 and through a hole in the bumper. Nut 42 which is threaded onto the end of bolt 40 draws and holds the assembly in contact with the bumper. Since the fixture for securing the assembly to the bumper includes bolts 22 and 24, the heads of which are embedded in the respective lobes of element 10 and which are insulated completely from the guard, a substantial amount of the force from a blow on the guard is absorbed by the element regardless of whether the blow is directly on the element or on the guard. Sleeves 44 and 46 extending through holes 26 and 32 and surrounding bolts 22 and 24 respectively are preferably provided to assist in retaining element 10 in its proper position and to further insulate the bolts from the metal of the guard.

It is apparent from the foregoing description that element 10 not only cushions the impact from a direct blow and thus prevents scratching and cracking of the plating on the bumper and guards of the colliding vehicles but also effectively absorbs to a substantial degree the impact or shock resulting from the blow whether on the guard or on element 10. A further advantage of the present guard mounting over most standard or conventional mountings is that the present mounting consisting of bolt 40, bracket 28 and bolts 22 and 24 extends completely through the guard and does not depend on a bracket spot welded to the inner surface of the guard. Experience has shown that the conventional bumper guard will readily snap loose from the spot welded bracket when bumped severely. The present mounting being free from spot welding and more securely anchored prevents this.

In the embodiment illustrated in Figure 3, the present invention is applied to the mounting between the bumper 50 and its support 52. A bolt 54 embedded in a hemispherically shaped element 56 extends through a hole 58 in the bumper and through a hole in the support and is secured in place by a nut 60 threaded onto the end thereof. Element 56 can be constructed of rubber, either synthetic or natural, vinyl or other similar materials and preferably contains a sleeve 62 extending through hole 58 and abutting against the surface of support 52 to form an insulating washer between the support and the bumper. This construction performs the same functions as those described with reference to Figure 2, i. e. it cushions direct blows on element 56 so that direct damage to the bumpers of either vehicle is minimized and it absorbs a substantial amount of the shock or impact of the blow regardless of whether the blow is directly on the bumper or on resilient element 56. The exact shape of element 56 is not of particular importance although it is desirable to have the surface of relatively long smooth curves terminating at the bumper in a rather thin edge.

Figure 4:
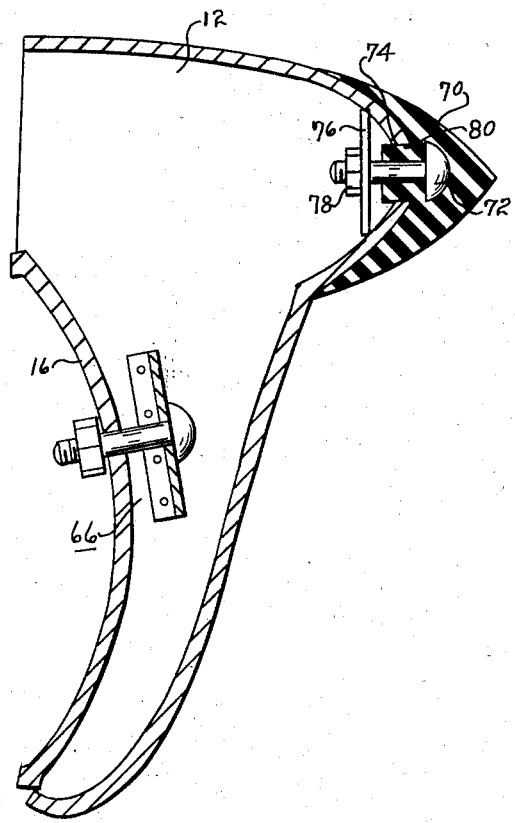
Figure 4 is a vertical cross sectional view through a bumper guard similar to those of Figure 1, showing a modified form of the present invention.

Figure 4 illustrates a further modified form wherein the conventional mounting 66 for the guard is retained and a resilient element 70 is mounted on the forward end or nose of the guard. This element consists of a modified conically shaped member formed to fit snugly over said end and blend into the sides of the guard. A bolt 72 having its head embedded in the element extends through a hole 74 in the guard and through a bracket 76 which in this embodiment may be disc shaped. A nut 78 threaded onto the end of the bolt and bearing against bracket 76 draws and holds element 70 firmly against the surface of the guard and seats brackets 76 firmly against the internal side walls of the guard 12. A sleeve 80 attached to the inner side of element 70 is preferably included to assist in centering the element on the forward end of the guard and to insulate the bolt therefrom. This embodiment can be readily adapted to most conventional bumper guards of the type generally referred to herein and functions primarily to cushion blows from bumping vehicles and thereby to prevent direct damage to the vehicles.

In the modifications shown and described herein various colored materials can be used for the elements. These colors would normally be selected to match or blend with the colors on the particular automobiles on which they are mounted. Another particular advantage of the present bumper elements is that they can be coated with a fluorescent paint and hence not only serve as a means of preventing damage to the vehicles when they collide but also as a reflector to improve the visibility of the vehicle at night.

Various changes and further modifications can be made in the present invention to adapt it to various installations.

I claim:

1. In combination with a bumper member having a hole therethrough, a relatively thick solid member of resilient material seated on the outer surface of said bumper member, a bolt having its head embedded in said resilient member and extending through the hole in said bumper member, a resilient sleeve joined integrally with said resilient member on the side contacting the surface of said bumper member and surrounding said bolt in said hole, and a support member for said bolt positioned on the side of said bumper member opposite said resilient member for securing said resilient member on said outer surface.

2. In combination with a bumper member having a hole therethrough, a relatively thick solid member formed of resilient material and being generally conical in shape seated on the outer surface of said bumper member, a bolt having its head embedded in said resilient member and extending through the hole in said bumper member, a resilient sleeve joined integrally with said resilient member on the side contacting surface of said bumper member and surrounding said bolt in said hole, and a displaceable disc for anchoring said bolt on the side of said bumper member opposite said resilient member.

3. In combination with a bumper member having a hole therethrough, a cushioning attachment including a relatively thick solid member of resilient material seated on the outer surface of said bumper member, a bolt having its head embedded in said resilient member and extending through the hole in said bumper member, a resilient sleeve joined integrally with said resilient member on the side contacting the surface of said bumper member and surrounding said bolt in said hole, and a displaceable disc anchoring said bolt on the side of said bumper member opposite said resilient member and spaced from the part of said bumper member defining said hole, for securing said resilient member on said outer surface.

4. In combination with a bumper member having a hole therethrough, a relatively thick solid member of resilient material seated on the outer surface of said bumper member, a bolt having its head embedded in said resilient member and extending through the hole in said bumper member, a resilient sleeve joined integrally with said resilient member on the side contacting the surface of said bumper member and surrounding said bolt in said hole, and a support member for said bolt positioned on the side of said bumper member opposite said resilient member and spaced from the part of said bumper member defining said hole, for securing said resilient member on said outer surface.

5. In combination with a bumper member having a hole therethrough, a relatively thick solid member formed of resilient material and being generally conical in shape seated on the outer surface of said bumper member, a stud having one end embedded in said member and extending through the hole in said bumper member, a resilient sleeve joined integrally with said resilient member on the side contacting the surface of said bumper member and surrounding said stud in said hole, and a support member for said stud positioned on the side of said bumper member opposite said resilient member and spaced from the part of said bumper member defining said hole, for securing said resilient member on said outer surface.

References Cited in the file of this patent

UNITED STATES PATENTS

| | | |
|---|---|---|
| 1,858,541 | Duffy | May 17, 1932 |
| 1,930,189 | Barbara | Oct. 10, 1933 |
| 2,054,838 | Short | Sept. 22, 1936 |
| 2,062,313 | Jandus et al. | Dec. 1, 1936 |
| 2,144,167 | Sanders | Jan. 17, 1939 |
| 2,182,085 | Kellner et al. | Dec. 5, 1939 |
| 2,230,333 | Painter | Feb. 4, 1941 |
| 2,246,752 | Paddock | June 24, 1941 |
| 2,250,565 | Bahr | July 29, 1941 |
| 2,259,440 | Fageol | Oct. 21, 1941 |
| 2,308,094 | Mears | Jan. 12, 1943 |
| 2,614,877 | Benian | Oct. 21, 1952 |
| 2,624,607 | Weigand | Jan. 6, 1953 |
| 2,626,827 | Sandberg | Jan. 27, 1953 |
| 2,681,246 | Corydon | June 15, 1954 |

FOREIGN PATENTS

| | | |
|---|---|---|
| 688,309 | Great Britain | Mar. 4, 1953 |
| 694,056 | Great Britain | July 15, 1953 |